J. W. Hoffman.

Railroad Switch.

N° 7,243.  Patented Apr. 2, 1850.

UNITED STATES PATENT OFFICE.

J. W. HOFFMAN, OF SOUTHWARK, PENNSYLVANIA.

OSCILLATING SELF-ADJUSTING RAILROAD-FROG.

Specification of Letters Patent No. 7,243, dated April 2, 1850.

*To all whom it may concern:*

Be it known that I, JOHN W. HOFFMAN, of Southwark, in the county of Philadelphia and State of Pennsylvania, have invented a new and useful machine for the purpose of affording a solid bearing to car-wheels where the rails cross each other on railroads, known as the " Self-Acting Revolving Railroad-Frog; " and I do hereby declare that the following is a full, clear, and exact description of the construction and operation of the same, reference being had to the annexed drawings, making a part of this specification, in which—

Figure 1:
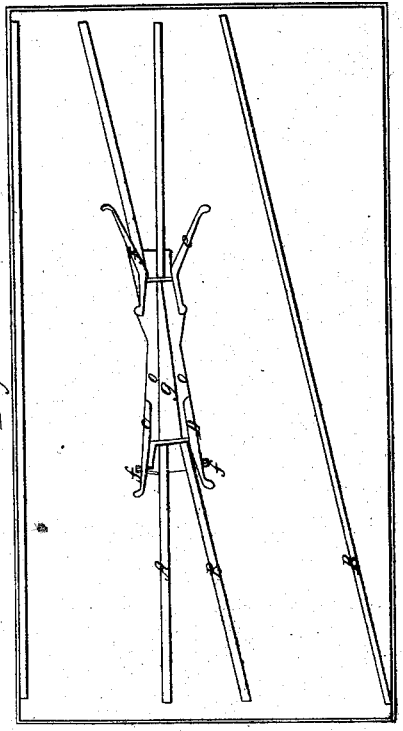
Figure 2:
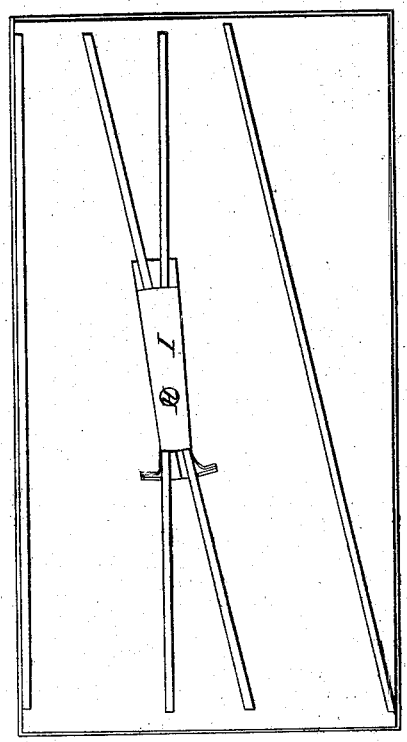

Figure 1 is a perspective view, Fig. 2 is a ground view, and Figs. 3, 4, 5, 6, and 7, are sectional views.

Fig. 1, letters A, A and B, B, are rails forming track for cars; C, D, and e, f, are arms of frog, o, o, and G, is frog, J, J are projections of base.

Figure 5:
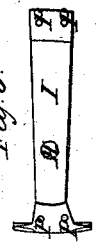

Fig. 5, letters p, p, p, p, are screw holes, H is a bolt hole.

Figure 7:

Fig. 7, letter G, is top section, o, o is lower section, L is bolt, K is a burr; C, D, and e, f, are arms.

All the other figures are lettered the same as these already described.

Figure 3:
Figure 4:
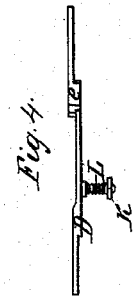
Figure 6:
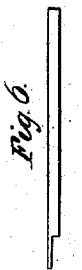

In the construction of my invention Fig. 5, is a cast or wrought iron base with two screw holes made in each end, as shown by p, p, p, p, and one large bolt hole as shown by H. Fig. 7, is made out of wrought iron or steel, o, o is the lower section or plate of metal, to this plate or section four arms are riveted or welded fast in a secure substantial and firm manner. So as to be solid as shown by C, D, and e, f, in Figs. 1, 4, and 7; when the arms C, D, and e, f, are fastened to plate or section o, o, as before described then section, G, Figs. 1, 3, and 7 is placed on the top of section o, o, and firmly secured to section o, o, by being riveted or welded to it, so as to form one solid piece of metal, this being done a hole is made through both sections, G, and o, o, in this hole a bolt is put and firmly welded fast so as to be perfectly firm and solid, this bolt projects below and has a screw cut on it with a burr fitting the screw as shown by L, and K, in Figs. 4 and 7, Fig. 7, being completed is taken and placed on base I, Fig. 5, with bolt L, Fig. 7, going down through hole H, Fig. 5, burr K, is then screwed fast on bolt L, which secures figures 5, and 7 together leaving at the same time Fig. 7, free to revolve or turn on base I, Figs. 2, and 5; the frog being now completed it is ready to be placed on the rail road beyond a turnout where the two rails cross each other, as shown in Figs. 1, and 2, the frog being thus placed the rails are secured to it by means of screw bolts going through the end of the rails and then down in holes p, p, p, p of base I Fig. 5. Fig. 6, is the section of the rail which is connected to the frog.

The frog being now down and the rails attached, it is ready for action, and is acted upon and regulated by the car wheel, and will at all times give a good solid and substantial bearing for the cars to run upon, where the rails intersect or cross each other as before described, if the cars are on rails B, B, Fig. 1, the flange of the wheel will come against D, and as the flange passes between the rail and arm D, the frog must turn and G, will come on a line with rail, B, and the cars will pass on over the frog, if the cars are on the same track but going the other direction in that case the out side of the tread of the car wheel will come against arm f, and as the wheel passes it will move arm f, out and turn the frog so as to form a line with the rails on which the cars are running when the cars are on rails A, A, and in motion the action of the frog will be the same as described when on rails B, B; arms C and D, are acted upon by the flange of the car wheel, while arms e and f, are acted upon by the out edge of the tread of the car wheel; arms C and D, are level with the top of the rails they rest and move on a projection of the base shown by J, J Fig. 1, arms e and f, rest on and move above the top of the rails, the rails affording a bearing for arms e and f, while acted upon.

Having thus fully described the mode of constructing my frog together with its manner of operating, I will now point out some of its advantages. First, it is self acting; second, it affords a solid and firm bearing for the car wheels to run upon; third, it dispenses with and does away the use of a triangular point formerly used where rails cross each other which requires almost constant repairing; fourth, it is not likely to get out of repair from the fact that it is simple and consists when completed of only two pieces the base and top, neither of which can be seriously affected by climate or weather; fifth, it is not likely to wear out or want replacing very soon, there is but little friction on it, it only requires the action of one wheel to right the frog for the train to pass over it.

I wish it distinctly understood that I do not claim the application of my frog to any part or place on railroads except simply where the rails cross each other as is always the case at a turnout, neither do I claim as my invention the action of the car wheels on the arms of my frog.

What I do claim as new and my invention desiring to secure the same by Letters Patent is—

A rail road frog constructed applied and operating essentially in the manner and only for the purpose herein set forth.

J. W. HOFFMAN.

Witnesses:
A. E. HOFFMANE,
C. ISARD.